(12) United States Patent
Jechoux

(10) Patent No.: US 7,136,675 B2
(45) Date of Patent: Nov. 14, 2006

(54) METHOD OF DISTRIBUTING COMMUNICATIONS WITHIN A CELL OF A RADIO-COMMUNICATION NETWORK, AND A CORRESPONDING DEVICE AND BASE STATION

(75) Inventor: Bruno Jechoux, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1009 days.

(21) Appl. No.: 09/779,512

(22) Filed: Feb. 9, 2001

(65) Prior Publication Data

US 2001/0046883 A1    Nov. 29, 2001

(30) Foreign Application Priority Data

Feb. 16, 2000  (FR)  .................................. 00 01926

(51) Int. Cl.
*H04M 1/00*  (2006.01)
(52) U.S. Cl. ................. 455/562.1; 455/273; 455/277.1
(58) Field of Classification Search ............. 455/562.1, 455/273, 561, 277.1; 342/354, 368, 359, 342/372, 373; 375/347, 316
See application file for complete search history.

(56) References Cited

U.S. PATENT DOCUMENTS

| | | | | |
|---|---|---|---|---|
| 4,225,868 A | * | 9/1980 | Mazur | 343/765 |
| 5,448,248 A | * | 9/1995 | Anttila | 342/400 |
| 5,504,937 A | * | 4/1996 | Kangas | 455/453 |
| 5,742,911 A | * | 4/1998 | Dumbrill et al. | 455/562.1 |
| 5,805,996 A | * | 9/1998 | Salmela | 455/453 |
| 5,815,525 A | * | 9/1998 | Smith et al. | 375/130 |
| 5,936,580 A | * | 8/1999 | Van Puijenbroek | 343/700 MS |
| 5,966,670 A | * | 10/1999 | Keskitalo et al. | 455/562.1 |
| 5,969,689 A | * | 10/1999 | Martek et al. | 343/758 |
| 6,014,567 A | * | 1/2000 | Budka | 455/453 |
| 6,091,788 A | * | 7/2000 | Keskitalo et al. | 375/347 |
| 6,108,323 A | * | 8/2000 | Gray | 370/335 |
| 6,181,276 B1 | * | 1/2001 | Schlekewey et al. | 342/372 |
| 6,188,913 B1 | * | 2/2001 | Fukagawa et al. | 455/562.1 |
| 6,266,529 B1 | * | 7/2001 | Chheda | 455/436 |
| 6,308,085 B1 | * | 10/2001 | Shoki | 455/562.1 |
| 6,463,301 B1 | * | 10/2002 | Bevan et al. | 455/562.1 |
| 6,463,303 B1 | * | 10/2002 | Zhao | 455/562.1 |

FOREIGN PATENT DOCUMENTS

| | | |
|---|---|---|
| EP | 0 734 194 | 9/1996 |
| EP | 1 014 482 | 6/2000 |

* cited by examiner

*Primary Examiner*—Temica Beamer
*Assistant Examiner*—Joy K. Contee
(74) *Attorney, Agent, or Firm*—Oblon, Spivak, McClelland, Maier & Neustadt, P.C.

(57) ABSTRACT

The invention relates to a method of distributing communications established by radio-communication terminals, within a geographic cell of a radio-communication network, the geographic cell being sub-divided into at least two geographic sectors.

According to this invention, the method comprises a step of modifying, by rotation, the orientation of the sectors within said cell.

14 Claims, 4 Drawing Sheets

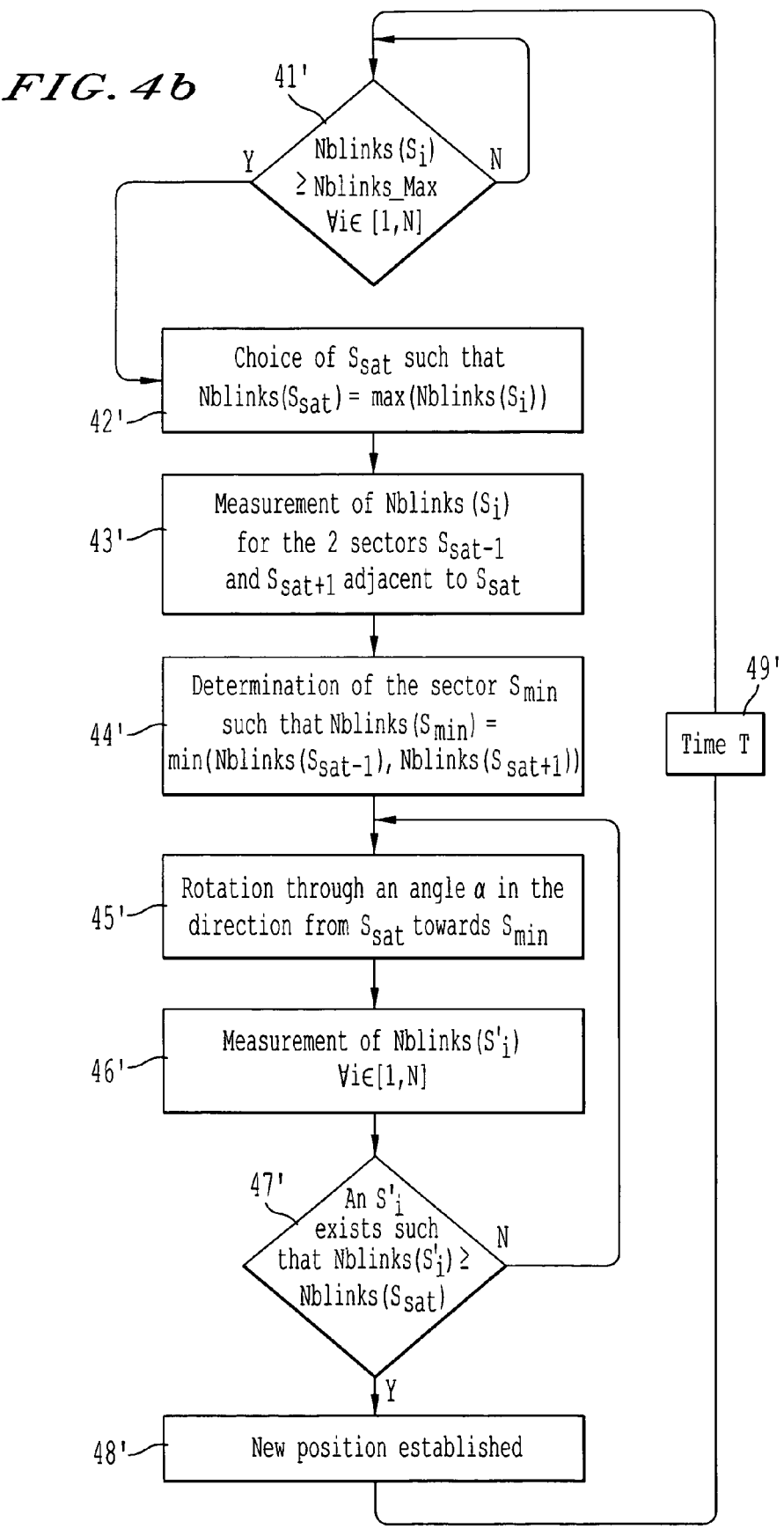

METHOD OF DISTRIBUTING COMMUNICATIONS WITHIN A CELL OF A RADIO-COMMUNICATION NETWORK, AND A CORRESPONDING DEVICE AND BASE STATION

BACKGROUND OF INVENTION

1. Field of Invention

The field of invention is that of radio-communications.

More precisely, the invention relates to the problem of saturation of the radio-communication cells, linked to the number of channels available within the cell and to the maximum transmission power of the base station associated with each cell of the network.

2. Description of the Related Art

It will be recalled that cellular telecommunications networks are constituted by a meshing of their area of coverage into geographic areas of smaller size called cells. These cells themselves are generally sub-divided into geographic sectors. Traditionally, as shown in FIG. 1, a cell 10 is divided into three sectors 111 to 113, each with an angular aperture approximately equal to 120°.

Each cell 10 corresponds to the geographic area covered by a base station 12, which transmits and/or receives signals to and/or from radio-communication terminals 13 present in the cell.

An important problem inherent to radio-communication networks is that the number of communications that can be established, in one cell, between a base station and the various radio-communication terminals present in the cell, is limited. This limitation is linked, on the one hand, to the maximum number of available channels in the cell, and, on the other hand, to the maximum power that the base station can transmit.

According to one known technique, a predetermined number of communication channels is generally attributed to each of the sectors of a cell. A disadvantage of this technique of the prior art is that, as soon as all the channels attributed to a sector are used, any new request for a terminal present in the sector and wishing to establish a communication, is refused.

Consideration has been given to allocating distinct levels of priority to the radio-communication terminals. In this way, when a terminal with a high level of priority transmits a request to open communication, it can have access to channel of communication at the expense of a low priority terminal, which is then compelled to put an end to its communication.

A disadvantage of this technique from the prior art is therefore that within a sector, one can only satisfy a limited number of requests to open communication, even if communication channels are available in other sectors of the cell.

In addition, the number of communications that can be set up in one cell is also limited by the maximum power that the base station can transmit, because of an interference phenomenon.

At present, two sources of interference can be distinguished.

On the one hand, the signals transmitted within a sector, by the radio-communication terminals or by the base station are propagated partially into adjacent sectors, belonging to the cell under consideration, or into a neighboring cell. Within a given sector, interfering signals coming from adjacent sectors are therefore added to the wanted signals in the form of inter-sector interference.

On the other hand, within a given sector, a radio-communication terminal represents a potential source of interference for the neighboring terminals, since the signals intended for a particular terminal are also received by all the neighboring terminals, and thereby constitute inter-sector interference.

It is therefore clearly apparent that, the greater the number of terminals in communication in a cell, the more important are the inter-sector and intra-sector interference phenomena. Indeed, in order to compensate for these interference phenomena and to maintain a good signal to noise ratio for all the communications within a cell, it is necessary to increase the transmission power of the base station of the cell under consideration. When the interference is too great, which is particularly frequent in the case of CDMA (Code Division Multiple Access), the transmission power required at the base station to obtain a signal to noise ratio that is adequate for reception, can become too great and can therefore lead to saturation of the base station.

Therefore, another disadvantage of techniques of the prior art is that, because of an interference phenomenon, the number of communications that can be established within one sector is limited, even if communication channels remain available within the sector.

BRIEF SUMMARY OF THE INVENTION

An object of the invention is, in particular, to remedy these disadvantages of the prior art.

More precisely, an object of the invention is to provide a radio-communication cell in which the communications are distributed in a more homogeneous manner between the various sectors.

Another object of the invention is to implement a method of distributing communications within a radio-communication cell which is simple and inexpensive.

Yet another object of the invention is to enable one to satisfy a greater number of requests for opening communication within one cell.

A further object of the invention is to provide a radio-communication cell within which the total power radiated by the base station is transmitted in a more homogeneous manner in all the sectors of the cell.

Yet another object of the invention is to set to work a radio-communication cell within which the communications are of better quality and, in particular, within which the effects of interference are reduced.

Yet another object of the invention is to permit a better distribution of the communications within a radio-communication cell, without having to modify the parameters or the structure of the radio-communication terminals of the network.

These objects and others which will become apparent in what follows have been achieved according to the invention, using a method of distributing the communications established by the radio-communication terminals, within a geographic cell of a radio-communication network, the geographic cell being sub-divided into at least two geographic sectors, comprising a step of modification, by rotation, of the orientation of the sectors within the cell.

Hence the invention rests on a completely novel and inventive approach to the management of the geographic cell of a radio-communication network.

In effect, the invention rests, in particular, on a dynamic definition of the sectors of a radio-communication cell, covering an expandable geographic area, as a function of the number of communications established within the sectors of the cell. Advantageously, the boundaries of the various sectors of a cell can be displaced, by simple rotation, in such a way that a more homogeneous distribution of the number of terminals in communication in each one of the sectors is obtained.

The invention, is advantageously applicable to all types of radio-communication network and notably those to GSM (Global System for Mobiles), UMTS (Universal Mobile Telecommunication System) and CDMA (Code Division Multiple Access) Standards.

Advantageously, the step of modification is implemented according to at least one of the techniques belonging to the group comprising:
  the mechanical rotation of transmission antennae and/or reception antennae, each of the antennae being associated with one of the sectors of the cell;
  the reconfiguration of at least one network of smart antennae, each of the beams being associated with one of the sectors of the cell.

In effect, the modification of the orientation of the sectors of the cell can be carried out by mechanical rotation of a set of transmission antennae and/or reception antennae. Each antenna being associated with one of the sectors of the cell, the rotation of a given antenna leads to modification of the geographic area with which the corresponding sector is associated.

One may also implement the reconfiguration of a network of smart antennae, in the case where this technology is used by the operator of the radio-communication network. Each beam of the antenna being associated with one sector of the cell; it is clearly apparent that modification of the orientation of a beam leads to modification of the orientation of the associated sector. According to an advantageous technique of the invention, the modification step is implemented if at least one command criterion for the rotation is satisfied.

Hence, when it is desirable to proceed with a modification of the orientation of the sectors, so as, for example, to distribute in a more homogeneous manner the communications within the cell, a corresponding criterion is satisfied and commands the implementation of the modification step.

Advantageously, said at least one command criterion for rotation belongs to the group comprising:
  total transmission rate of at least one of the sectors is greater than a predetermined total transmission rate;
  the number of links established in at least one of the sectors is greater than a predetermined number of links.

These two criteria are in effect linked to the two factors limiting the number of communications that can be established, in one cell, between a base station and the various radio-communication terminals present in the cell, namely the maximum number of channels available within the cell, and the maximum power that the base station can transmit.

According to one advantageous characteristic of the invention, the modification step is only implemented if at least one of the following conditions is verified:
  the total transmission rate of at least one of the sectors is less than the total predetermined transmission rate;
  the number of links established in at least one of the sectors is less than the predetermined number of links.

In effect, if all of the sectors of a cell are saturated, that is to say if all the channels of communication of each of the sectors are used and/or if the total transmission rate of each of the sectors is greater than or equal to the maximum authorized total transmission rate, it is clearly apparent that implementation of the modification step is of no use. In such a case of saturation, the rotation of the sectors of the cell would not permit one to provide a more homogeneous distribution of the communications within the cell.

According to an advantageous technique, the method according to the invention comprises the following successive steps:
  Step A: detection of the sector or sectors of said cell for which at least one command criterion is satisfied;
  Step B: selection, from among the detected sector or sectors, of one sector in accordance with a first predetermined strategy;
  Step C: determination of a sector, from among the sectors adjacent to said selected sector, in accordance with a second predetermined strategy;
  Step D: modification, by rotation, of the orientation of the sectors of the cell through one predetermined angular step, of said selected sector towards said determined adjacent sector in a way that creates new sectors within said cell;
  Step E: detection of the new sector or sectors of said cell for which at least one tracking criterion relating to said selected sector is satisfied;
  Step F: if no new sector has been detected during Step E, reiteration of Step D; if not, a new position for the sectors of said cell is established.

Hence, a first step A enables one to detect the saturated sector or sectors of the cell. A second step B consists of choosing from among the sectors detected, the main sector from which load will be removed (that is to say, the sector whose communications load will be lightened thanks to carrying out rotation of the sectors). Next, step C allows one to select one of the sectors adjacent to the sector chosen in step B, to which the load of the chosen sector will be partially transferred, during step D of modifying the orientation of the sectors of the cell. Next, steps E and F consist of determining, according to a predetermined tracking criterion, if it is necessary or not to reiterate the modification step D.

According to an advantageous variant of the invention, the first predetermined strategy consists of selecting the sector for which the total transmission rate and/or the number of links established is the greatest, the second predetermined strategy consists of determining the sector adjacent to the selected sector for which said total transmission rate and/or the number of links established is less great, and said at least one tracking criterion relating to the selected sector belongs to a group comprising:
  the transmission rate of the detected sector is greater than or equal to the total transmission rate of the selected sector;
  the number of links established in the detected sector is greater than or equal to the number of links established in the selected sector.

Hence, during step B (respectively during step C) the sector with the greatest load is chosen (respectively the adjacent sector with the least load) in terms of total transmission rate and/or the number of established links. If, after the modification step, there is at least one of the new sectors of the cell whose load, in terms of transmission rate and/or the number of links, is greater than or equal to the load of the sector chosen during step B, a new position is then established, and it is not necessary to reiterate the modification step.

According to an advantageous characteristic of the invention, the cell being sub-divided into three sectors, the modification step is not implemented if two sectors have an identical total transmission rate and/or an identical number of established links, the total transmission rate and/or the number of established links being respectively greater than the predetermined total transmission rate and/or the predetermined number of links.

It is clearly apparent that, in the case where two sectors of a cell with three sectors, have the same level of saturation in terms of total transmission rate and/or the number of established links, the implementation of a modification step does not enable one to distribute the number of communications within the cell in a more homogeneous manner.

Advantageously, during the modification step, the speed of rotation of the sectors is matched to the time for carrying out a transfer of communication from one sector to another.

Hence, a terminal which finds itself approximately at the boundary between two sectors before the modification step, and which would therefore compel the switching from a first to a second sector, because of the change in orientation of the sectors, advantageously has the time to carry out a transfer of communication from the first to the second sector. Such a characteristic thereby reduces the risk of accidental interruption of communication during the modification step.

The invention also relates to a device for distributing communications established by radio-communication terminals, within a cell of a radio-communication network, using means of modifying, by rotation, the orientation of the sectors of the cell.

The invention further relates to a base station of a cell of a radio-communication network, implementing a method of distributing the communications such as that mentioned above and/or comprising a device such as that mentioned above.

BRIEF DESCRIPTION OF THE DRAWINGS

Other characteristics and advantages of the invention will more clearly become apparent on reading the following description of a preferred embodiment, given purely by way of a simple illustrative example and being non-limitative, and the appended drawings among which:

FIGS. 4a and 4b show a general synoptic chart of the invention in the form of a succession of steps implemented in two possible embodiments of the invention.

DETAILED DESCRIPTION OF THE DRAWINGS

The general principle of the invention rests on the modification, by rotation, of the orientation of the sectors of a radio-communication cell.

Figure 3:
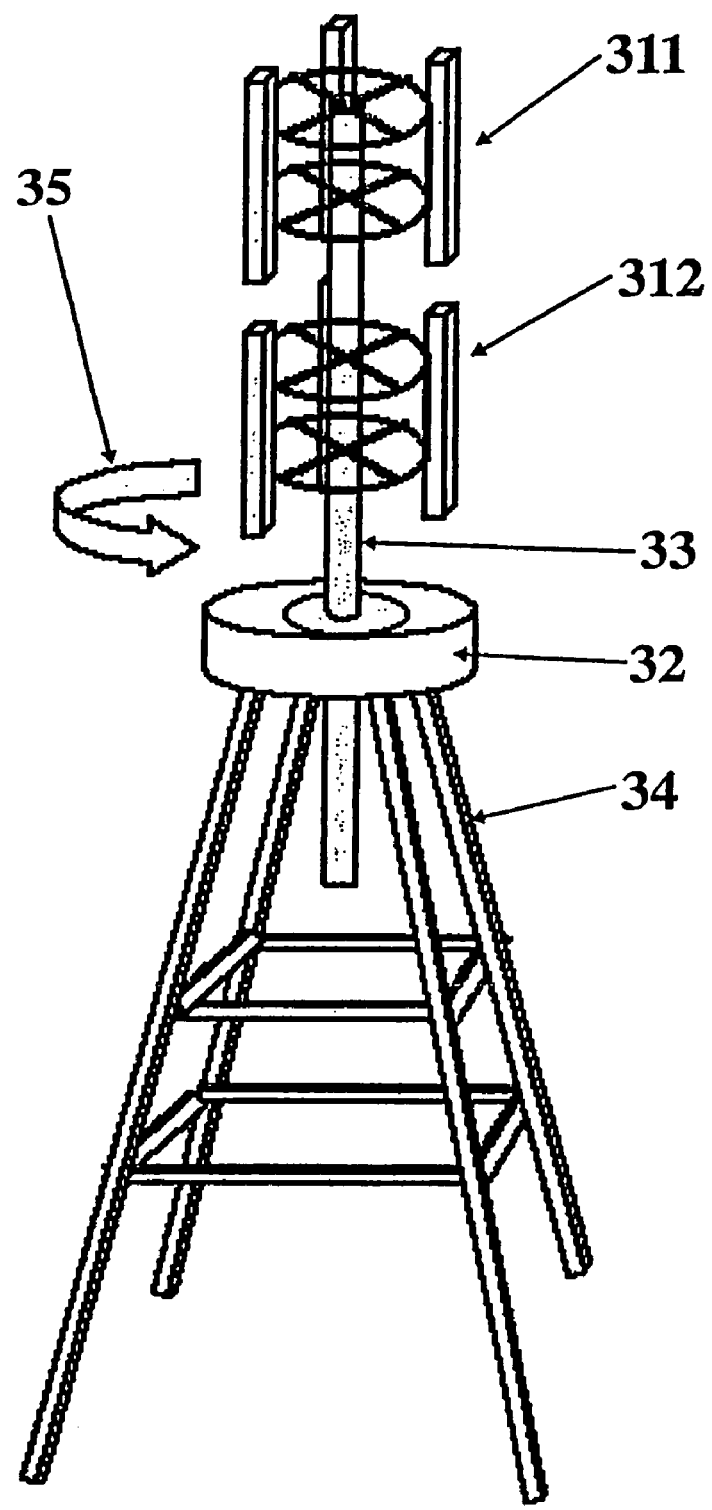
FIG. 3 illustrates a radio-communication device that permits one to modify, by rotation, the orientation of the sectors of a cell, according to FIG. 1.

An embodiment of a device that enables one to modify, by rotation, the orientation of the sectors of a geographic cell of a radio-communication network is given, making reference to FIG. 3.

The device comprises a fixed part 32, integral with a support 34, and a movable part 33, able to pivot with respect to the fixed element 32 in the direction of the arrow 35. In this example, a set of three transmission antennae 311, and a set of three reception antennae 312 are fixed to the movable part 33. Each of these six antennae 311 and 312 is therefore a transmission or a reception antenna for one of the three sectors of the radio-communication cell. It is clear however that the invention can be implemented during reception only or transmission only. Hence when one wishes to modify the orientation of the geographic sectors of one cell, the element 33 is turned through a predetermined angle in the direction of the arrow 35 in a way that causes the two sets of antennae 31 to pivot. Each antenna 31 then covers a new angular sector, which permits the defining of a new geographic sector of the cell.

Such a device enables one to implement the modification of the orientation of the sectors of a geographic cell by mechanical rotation of transmission antennae and/or reception antennae associated with the cell under consideration. Another embodiment (not represented) can consist, for example, of reconfiguring a network of smart antennae. In this case, each beam covers one sector in transmission or in reception.

Figure 4A:
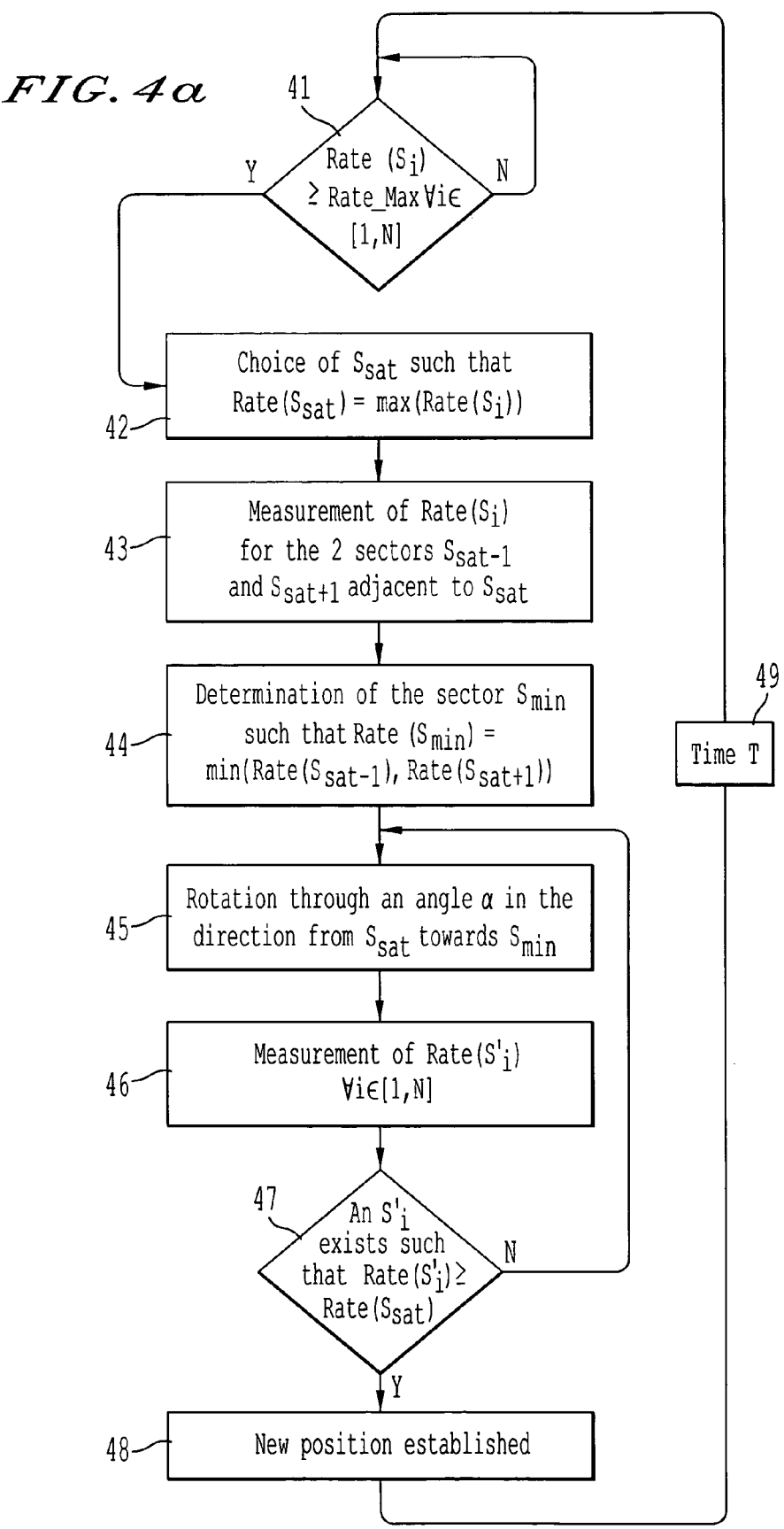

Referring to FIG. 4a, the succession of steps is now shown for the implementation of one particular embodiment of the invention. A geographic cell is considered, divided into N sectors numbered $S_1$ to $S_N$. In a first possible embodiment of the invention, the rotation of the sectors of the cell is implemented if one of the sectors satisfies a predetermined total transmission rate criterion. In effect, the notion of total transmission rate of a sector and hence of maximum power transmitted by the base station associated with the cell, is directly linked to the phenomenon of interferences previously described.

During a first step 41, a device which may be, for example, the base station associated with the cell, calculates the total transmission rate $Rate(S_i)$ associated with each of the sectors $S_1$ to $S_n$ of the cell, and compares the value $Rate(S_i)$ to a predetermined value Rate_Max. The value Rate_Max corresponds to a maximum transmission rate allowed for a given sector. This value is, for example, imposed by the operator of the radio-communication network under consideration. In the case of radio-communication networks to the UMTS (Universal Mobile Telecommunication System) standard, the maximum total transmission rate on a carrier is, for example, approximately equal to 2 Mbits/s.

If no sector $S_i$ of the cell has a total transmission rate greater than or equal to Rate_Max, step 41 is reiterated.

In the contrary case, in the course of a step 42, the sector $S_{sat}$ having the greatest total transmission rate is chosen from among the sectors detected during step 41.

In a step 43, the total transmission rates $Rate(S_i)$ of the two sectors $S_{sat-1}$ and $S_{sat+1}$ adjacent to sector $S_{sat}$ are measured.

Step 44 allows one to determine, from among the two sectors $S_{sat\_1}$ and $S_{sat+1}$ adjacent to sector $S_{sat}$, the sector $S_{min}$ having the least total transmission rate ($S_{min}$ is such that $Rate(S_{min})=\min(Rate(S_{sat-1}),Rate(S_{sat+1}))$).

In the course of step 45, rotation of the sectors of the cell is implemented. The angular step of the rotation is a predetermined angle α, for example fixed by the operator of the radio-communication network under consideration. In this embodiment of the invention, the rotation occurs in the direction from the sector $S_{sat}$ towards the sector $S_{min}$. After rotation, therefore, a new sub-division of the cell into N sectors designated $S'_1$ to $S'_N$ is obtained.

Step 46 then consists of measuring the total transmission rate $Rate(S'_i)$ for each of the new sectors $S'_1$ to $S'_N$ of the cell.

In the course of step 47, it is then determined if there exists a sector $S'_i$ having a total transmission rate greater than or equal to the transmission rate of the sector $S_{sat}$. If no sector S'$_i$ from among the sectors S'$_1$ to S"$_N$ validates the relationship Rate(S'$_i$)≧Rate(S$_{sat}$), then step 45 is reiterated.

If, on the other hand, at least one of the new sectors S'$_i$ has a total transmission rate greater than or equal to the transmission rate of the sector S$_{sat}$, a new position of the sectors of the cell is then established in the course of step 48.

Figure 2A:
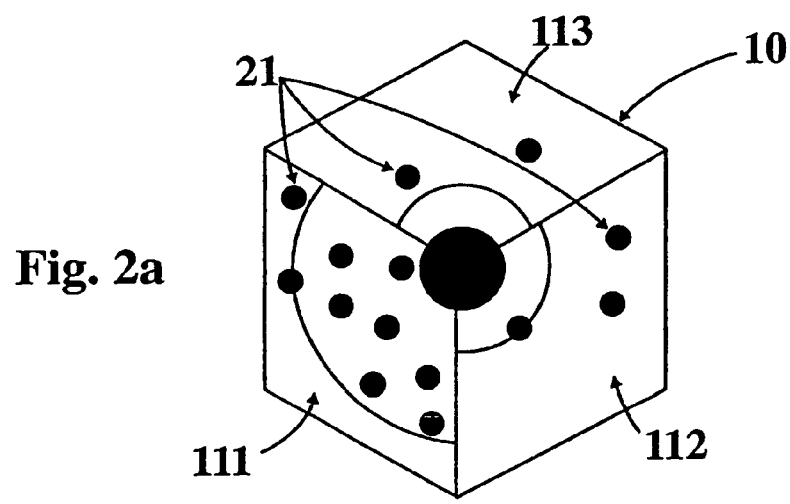
FIGS. 2a and 2b show the implementation of the rotation of geographic sectors, in a radio-communication cell similar to that in FIG. 1, in a manner that provides a more homogeneous distribution of the communications within the cell.
Figure 2B:
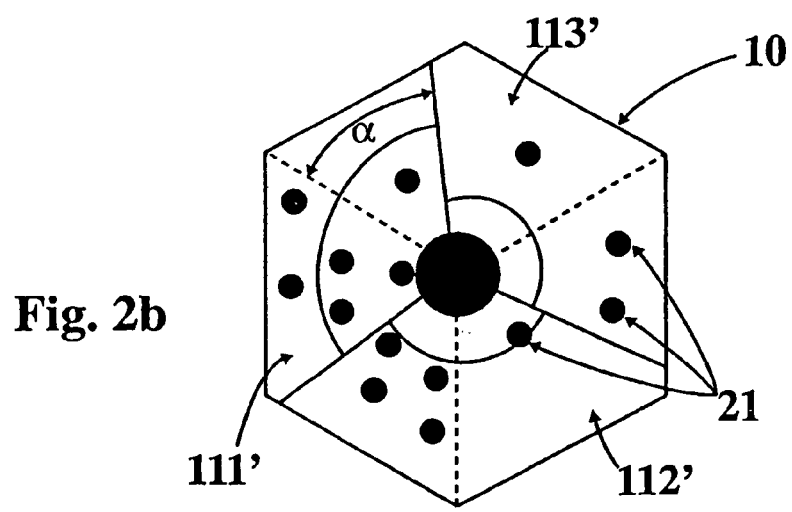

In effect, this signifies that the communications established in the cell, have then been redistributed in a more homogeneous manner between the various sectors as FIGS. 2a and 2b illustrate.

In FIG. 2a, a geographic cell 10 is divided into three sectors 111 to 113 with angular apertures of 120°. For example, nine communications 21 have been established in a first sector 111, three communications 21 established in a second sector 112, and two communications 21 established in the third sector 113. The implementation of the first embodiment described above advantageously allows one to modify the orientation of the sectors 111 to 113 by rotation through an angle α, as illustrated by FIG. 2b in such a way that six communications 21 are grouped together in a first sector 111', five communications 21 in a second sector 112', and three communications 21 in the third sector 113'.

According to the first embodiment shown in relation to FIG. 4a, step 41 of the method is then reiterated after a period of time T, fixed for example by the operator of the radio-communication network, and introduced during a time delay step 49.

The succession of steps implemented in a second embodiment of the invention will now be described in relation to FIG. 4b. Once again, a geographic cell is being considered which is divided into N sectors numbered S$_1$ to S$_N$. In this second possible embodiment of the invention, the rotation of the sectors of the cell is implemented if one of the sectors satisfies a predetermined criterion, relating this time to the number of links established in this sector. By established link, one understands here the use of a communication channel by a terminal present in the sector. In effect, the number of channels available, and therefore the number of links established in one sector by the radio-communication terminals is a limiting factor to the maximum number of communications that can be simultaneously made within a given sector.

The succession of steps implemented in this second embodiment is similar to the succession of steps implemented in the first embodiment illustrated by FIG. 4a, the criterion of total transmission rate Rate being systematically replaced by a criterion relating to the number of links established in a sector of the cell, designated NbLinks.

In the second particular embodiment described above, one can add an additional step 41'$_{bis}$ between steps 41' and 42', in the course of which, one checks that there exists at least one sector S$_i$ of the cell for which the number of links established is less than the number NbLinks_Max of channels of communication available in the sector. If such a sector exists, the method is progressed by passing to step 42'. In the contrary case, step 41'$_{bis}$ is reiterated until at least one of the sectors of the cell is carrying less load, that is to say until at least one communication channel becomes free for at least one of the sectors of the cell.

In the same way, one may consider a new step 41'$_{bis}$ between steps 41 and 42 of the first embodiment described in relation to FIG. 4a, in the course of which a check is made that there exists at least one sector S$_i$ of the cell for which the total transmission rate is less than the maximum authorized total transmission rate Rate_Max. If such a sector exists, the method then proceeds by passing to step 42. In the contrary case, step 41$_{bis}$ is reiterated until at least one of the sectors of the cell is carrying less load, that is to say until the total transmission rate of at least one sector of the cell becomes less than the value Rate_Max.

Figure 1:
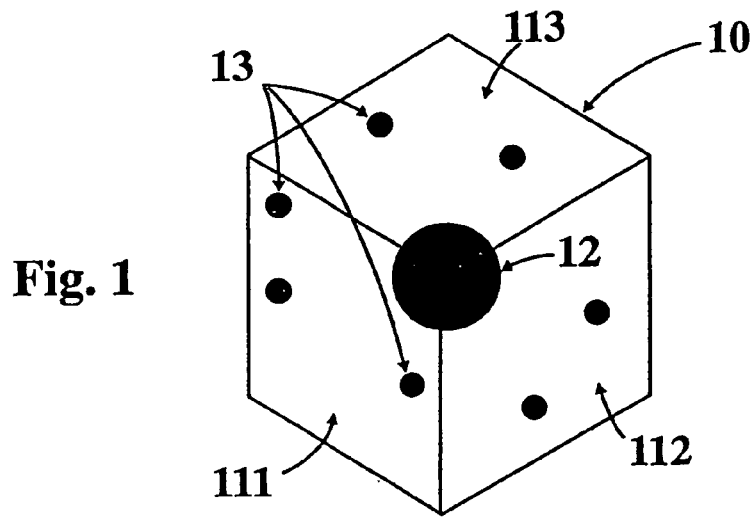
FIG. 1 illustrates a cell of a radio-communication network sub-divided into three sectors with angular apertures equal to 120°.

In the traditional case where the geographic cells of a radio-communications network are sub-divided into three sectors with angular apertures equal to 120° (FIG. 1), one may also implement an additional step 41$_{ter}$(and/or 41'$_{ter}$) between steps 41 and 42 (embodiment No. 1) and/or between steps 41' and 42' (embodiment No. 2). During this additional step, a check is made that there are not two sectors selected during step 41 (and/or 41') carrying the same level of load, that is to say having an identical total transmission rate (and/or having established an identical number of links).

One can, of course, envisage an embodiment variant of the invention in which steps 41$_{bis}$ and 41$_{ter}$ (respective 41'$_{bis}$ and 41'$_{ter}$) are both implemented between steps 41 and 42 (respectively 41' and 42'). One may also envisage an embodiment variation of the invention in which only step 41$_{bis}$ (respectively 41$_{bis}$) is implemented between steps 41 and 42 (respectively 41' and 42') and an embodiment variation in which only step 41'$_{ter}$ (respectively 41'$_{ter}$) is implemented between steps 41 and 42 (respectively 41' and 42').

Another embodiment variation of the invention can consist of combining the two embodiments previously described with the help of FIGS. 4a and 4b, that is to say, simultaneously taking into account two command criteria for the rotation of the sectors, namely a total transmission rate criterion and a criterion relating to the number of links established in one sector. More generally, other criteria can be taken into account in order to refine the processing.

One may also envisage a succession of steps similar to that of the two embodiments previously described, the passage from one step to the following step being determined on the one hand, as a function of the total transmission rate of a sector, and on the other hand, as a function of the number of links established in that sector. One can also consider weighting the command criteria for the rotation, as a function of the relative importance that one wishes to accord the total transmission rate on the one hand and the number of links established on the other hand.

The invention claimed is:

1. A method of distributing communications established by radio-communication terminals, within a geographic cell of a radio-communication network, said geographic cell being sub-divided into at least two geographic sectors, the improvement comprising:
   synchronously rotating an orientation of all of said at least two geographic sectors if
      a total transmission rate of one of said at least two geographic sectors is greater than a predetermined total transmission rate, or
      a number of links established in one of said at least two geographic sectors is greater than a predetermined number of links.

2. The method according to claim 1, wherein said step of synchronously rotating comprises one of:
   mechanically rotating at least one of a transmission antennae and a reception antennae associated with said at least two geographic sectors; and
   reconfiguring a beam of a smart antennae associated with said at least two geographic sectors.

3. The method according to claim 1, wherein said step of synchronously rotating comprises one of:
   synchronously rotating only if a total transmission rate of another of said at least two geographic sectors is less than said predetermined total transmission rate; and synchronously rotating only if a number of links established in another of said at least two geographic sectors is less than said predetermined number of links.

4. The method according to claim 1, wherein said step of synchronously rotating comprises:
   detecting one or more sectors having one of a total transmission rate greater than a predetermined total transmission rate and a number of established links greater than a predetermined number of links;
   selecting one of the one or more sectors in accordance with a predetermined prioritization strategy;
   identifying a sector adjacent to said selected sector in accordance with a predetermined selection strategy;
   synchronously rotating an orientation of said all of said at least two sectors through a predetermined angle to rebalance a load between said selected sector and said identified sector and to create at least two re-oriented sectors; and
   determining if any of the at least two re-oriented sectors satisfy at least one tracking criterion; and
   repeating said step of synchronously rotating if no re-oriented sector satisfies said at least one tracking criterion.

5. The method according to claim 4, wherein
   said predetermined prioritization strategy comprises selecting a sector for which at least one of the total transmission rate and the number of established links is the greatest,
   said predetermined selection strategy comprises determining a sector adjacent to said selected sector for which at least one of the total transmission rate and the number of established links is the least, and
   said at least one tracking criterion comprises one of
      a total transmission rate of a re-oriented sector is greater than or equal to a total transmission rate of said selected sector, and
      a number of links established in a re-oriented sector is greater than or equal to a number of links established in said selected sector.

6. The method according to claim 2, wherein, when said cell is sub-divided into three sectors, said synchronous rotation step is not implemented if two of said three sectors have at least one of an identical total transmission rate and an identical number of established links.

7. The method according to claim 1, wherein said step of synchronously rotating comprises:
   matching a sector rotation speed to a time for carrying out a transfer of communication from one sector to another.

8. A device for the distribution of communications established by radio-communication terminals, within a cell of a radio-communications network, comprising:
   means for synchronously rotating an orientation of all sectors in said cell according to any one of steps of claims 1–7.

9. A base station for a cell of a radio-communication network, comprising:
   means for rebalancing a communications load among sectors in a cell according to any one of the steps of claims 1–7.

10. A method of distributing communications established by radio-communication terminals, within a geographic cell of a radio-communication network, said geographic cell being sub-divided into at least two geographic sectors, the improvement comprising:
   rotating an orientation of at least one of said at least two geographic sectors if
      a total transmission rate of one of said at least two geographic sectors is greater than a predetermined total transmission rate, or
      a number of links established in one of said at least two geographic sectors is greater than a predetermined number of links, wherein said step of rotating includes:
   detecting one or more sectors having one of a total transmission rate greater than a predetermined total transmission rate and a number of established links greater than a predetermined number of links;
   selecting one of the one or more sectors in accordance with a predetermined prioritization strategy;
   identifying a sector adjacent to said selected sector in accordance with a predetermined selection strategy;
   rotating an orientation of a subset of said at least two sectors through a predetermined angle from said selected sector toward said identified adjacent sector so as to create one or more new sectors within said cell; and
   detecting at least one of the one or more new sectors satisfying at least one tracking criterion; and repeating said step of rotating an orientation of a subset if no new sector has been detected during said step of detecting at least one of the one or more new sectors, until a new sector is detected.

11. A base station for a cell of a radio-communication network, comprising:
   means for distributing communications among sectors in a cell according to the method of claim 10.

12. A method of distributing communications established by radio-communication terminals, within a geographic cell of a radio-communication network, said geographic cell being sub-divided into at least two geographic sectors, the improvement comprising:
   mechanically rotating an orientation of at least one of said at least two geographic sectors if
      a total transmission rate of one of said at least two geographic sectors is greater than a predetermined total transmission rate, or
      a number of links established in one of said at least two geographic sectors is greater than a predetermined number of links.

13. The method according to claim 1, wherein said step of mechanically rotating comprises:
   mechanically rotating at least one of a transmission antennae and a reception antennae associated with said at least one of said at least two geographic sectors.

14. A base station for a cell of a radio-communication network, comprising:
   means for distributing communications among sectors in a cell according any one of claims 12–13.

* * * * *